(12) United States Patent
Sheymov et al.

(10) Patent No.: US 7,236,598 B2
(45) Date of Patent: Jun. 26, 2007

(54) SYSTEMS AND METHODS FOR COMMUNICATION PROTECTION

(75) Inventors: Victor I Sheymov, Vienna, VA (US); Roger B Turner, Laurel, MD (US)

(73) Assignee: Invicta Networks, Inc., Vienna, VA (US)

( * ) Notice: Subject to any disclaimer, the term of this patent is extended or adjusted under 35 U.S.C. 154(b) by 934 days.

(21) Appl. No.: 09/862,477

(22) Filed: May 23, 2001

(65) Prior Publication Data

US 2001/0048745 A1    Dec. 6, 2001

(51) Int. Cl.
*G04F 11/30* (2006.01)
*H04L 9/00* (2006.01)
*H04K 1/00* (2006.01)

(52) U.S. Cl. .................. 380/270; 713/189; 713/162
(58) Field of Classification Search .......... 713/20–202; 380/270–273
See application file for complete search history.

(56) References Cited

U.S. PATENT DOCUMENTS 5,579,376 A    11/1996   Kennedy, III et al.
6,181,931 B1   1/2001    Alldredge

FOREIGN PATENT DOCUMENTS

WO    WO-00/1339    3/2000

OTHER PUBLICATIONS

Random number generation for residual life of mobile phone movement Hui-Nien Hung; Pei-Chun Lee; Yi-Bing Lin; Networking, Sensing and Control, 2004 IEEE International Conference on vol. 1, Mar. 21-23, 2004 pp. 30-33 vol. 1.*

The random-access control channel of a cellular mobile radio system Ling, Y.K.; Cattermole, K.W.; Teletraffic Symposium, 6th. Sixth United Kingdom May 24-26, 1989 pp. 14/1-14/7.*
Security enhancements for A5/1 without loosing hardware efficiency in future mobile systems Komninos, N.; Honary, B.; Darnell, M.; 3G Mobile Communication Technologies, 2002. Third International Conference on (Conf. Publ. No. 489) May 8-10, 2002 pp. 324-328.*
Copy of International Search Report dated Feb. 8, 2002, 3 pages.
Dahlia Malkhi, et al.; "Secure Execution of Java Applets Using a Remote Playground"; AT&T Labs Research, Florham Park, NJ; 1988 IEEE; pp. 40-51.
RSA Security; "Are Passwords Really Free? A Closer Look at the Hidden Costs of Password Security"; pp. 1-8.
Ian Goldberg and Marc Briceno "*GSM Cloning*"; www.isaac.cs.berkely.edu/isaac/gsm-faq.html; May 21, 2001, pp. 1-5.

(Continued)

*Primary Examiner*—David Jung
(74) *Attorney, Agent, or Firm*—Carlos R. Villamar; Nixon Peabody, LLP

(57) ABSTRACT

A communications system and method is provided to reliably protect communication systems, such as mobile phone systems, from unauthorized use, as well as to make the interception of wireless communication more difficult. Specifically, the static wireless phone number or other similar identifiers are not used for identification and authorization during communication between the mobile unit and a base station. Instead, a set of private identifiers is determined and is known only to the phone company and the base stations controlling the mobile phone calls. These private identifiers allow dynamic and continual updating of the mobile phone and base station directories with current valid identifiers that are used for communication between the devices.

13 Claims, 5 Drawing Sheets

OTHER PUBLICATIONS

"*GSM Cloning*"; www.isaac.cs.berekely.edu/isaac/gsm.html; May 21, 2001, pp. 1-4.

Pescatore; "Secure Use of the World Wide Web: Keeping Browers and Servers from Getting Snared", Trusted Information System; ISBN # 0-7803-327706; pp. 36-38.

Hynninen, "Experiences in Mobile Phone Fraud", Helsinki University of Technology, Department of Computer Science and Engineering, pp. 1-18 (May 21, 2001).

Feb. 8, 2002 International Search Report for PCT/US-01/16541.

* cited by examiner

SYSTEMS AND METHODS FOR COMMUNICATION PROTECTION

BACKGROUND OF THE INVENTION

1. Field of the Invention

This invention relates to communication systems. In particular, this invention relates to providing secure communication for wireless devices.

2. Description of Related Art

At least hundreds of millions of dollars are lost annually to unauthorized calls made from communication devices. In particular, unauthorized callers are able to clone wireless phone systems by intercepting the control signals passed between the wireless unit, such as a mobile phone unit, and a local base station. This interception usually occurs during a call set-up. It is relatively straight forward to clone wireless phone systems since most wireless unit identification numbers and phone numbers are static or are changed only with the movement of the mobile phone unit from one cell to another. In order to help alleviate the lost revenue attributable to unauthorized calls, some phone companies have initiated a pin number requirement which must also be dialed in addition to the called party's phone number, and other companies are using types of encrypted authentication.

SUMMARY OF THE INVENTION

However, the above systems are at least deficient in that the wireless unit's identification numbers and phone numbers, in many cases, are transmitted in the clear, i.e., there are not encrypted. If these numbers are encrypted, the underlying static identification numbers can be discovered if the encryption process is broken or if the key is compromised. Furthermore, while pin numbers which are transmitted in the call may offer some protection, the pin number is also static and could also be intercepted in a similar fashion as the wireless unit identification number and phone number.

Accordingly, the systems and methods of this invention are designed to reliably protect communication systems, such as mobile phone systems, from unauthorized use, which is commonly known as cloning, as well as to make the interception of wireless communication more difficult. In an exemplary embodiment of this invention, the static wireless phone number or other similar identifiers are not used for identification and authorization during communication between the mobile unit and a base station. Instead, a set of private identifiers is determined and is known only to the phone company and the base stations controlling the mobile phone calls. These private identifiers continually update the mobile phone and base station directories with current valid identifiers.

For example, by having private identifiers, a potential call intercepter, or cloner, must first guess where a target wireless phone is in a telecommunications cyberspace in an attempt to predict where the phone will next be located in the telecommunications cyberspace. This can be achieved by, for example, changing the private identifier for the wireless phone on a predetermined or random time schedule, or, for example, by making the identifier change each time the system completes a call. A base station is provided for generating a random sequence of private identifiers and also for maintaining a series of tables containing current and the next set of identifiers. These identifiers are distributed to authorized parties, using, for example, standard encryption techniques for an extra level of protection.

Aspects of the present invention relate to communication systems. In particular, aspects of the invention relate to providing secure communications between wireless devices and a base station or central control.

Aspects of the present invention also relate to changing a private identifier so as to control the wireless device's location in cyberspace.

Aspects of the present invention additionally relate to securing communications between a wired and a wireless devices.

Additionally, the systems and methods of this invention can be used in conjunction with copending U.S. patent application Ser. No. 09/571,377 entitled "Method of Communications and Communication Network Intrusion Protection Methods an Intrusion Attempt Detection System", incorporated herein by reference in its entirety.

In an exemplary embodiment, the systems and methods of this invention can provide a high level of protection and offer a chance to track and capture anyone attempting to clone a phone. First, for example, the identity of a mobile phone is constantly changed requiring that a cloner continue to intercept each call to attempt to track the phone's communications to track the updated current identifier. For example, a user powers-on near a cloner's intercept site and the phone ID number is copied from the communication between the mobile phone to the base signal. If the user places a call and the current ID number is intercepted and copied by the cloner, and if the exchanged communications signals are still in range of the intercept site, the next identifier is copied to the mobile phone at the "End" command. This next ID number is good for the next call and, if it is distributed to a third party in a reprogrammed phone, it may or may not be valid when the first unauthorized call is made.

If the original user places a call on their phone before the cloned phone is used, which is likely, a new current ID number has been issued and the base station will be able to automatically detect and set an alarm that a cloned phone is attempting a call when the current identifier fails to match the legitimate account's current identifier. Before the alarm is set and handed off to, for example, law enforcement, a verification process is initiated to determine if it is a legitimate user out of sequence with the base station due to system problems or a cloner attempting to clone the account.

A process similar to the initialization can be used to ask a series of questions known only to the legitimate user and for accessing unique information stored in a specific device. If the verification succeeds, the legitimate user can be reset in the sequence. If the verification fails, illegal activity can be confirmed and alternative action such as law enforcement may be initiated.

If the cloner manages to accomplish all of the above, and the cloner places a call before the legitimate user with a reprogrammed phone using the next identification number, the cloner can capture the sequence and temporarily may have an effective clone. However, as soon as the legitimate user attempts a call, the legitimate user trips the verification and the alarm processes described above. However, the user can maintain the original phone account and the cloned phone identification can be set aside for alternative action. This places the user of a cloned phone at high risk since the next identification number serves as a "flag" for tracking and location purposes. Law enforcement could, for example, obtain a wire tap warrant and listen in on all his future calls assuming an illegitimate account is established and maintained.

Secondly, in this exemplary embodiment, encryption is used to protect the identifiers during communications between the base station and mobile device requiring the cloner to break the encryption process to get the next valid identifier and decrypt it quickly to make a call before the next update as described above. Breaking the encryption process is time consuming, requiring specialized skills and extensive computer power. Note that even with a successful intercept and breaking of the encryption, the issues described above place the unauthorized user at high risk and would act as a deterrent against cloning.

Thirdly, in this exemplary embodiment, user privacy is enhanced since tracking and identification of the callers using interception techniques is very difficult. Since the identity of the mobile phone is changing the content of the intercepted phone call is difficult to relate to the user unless a database of all calls is maintained for each user and updated each time a new identification number is issued. The privacy of the actual conversations exchanged over the phone is outside the scope of this invention, however any privacy process can be fully implemented depending on, for example, the manufacturer without affecting the operation of the systems and methods of this invention.

In an exemplary embodiment, after criminal activity has been detected and verified, a number of features are available from this technology. First, detection of the illegal attempt to clone and use the phone can be accomplished in real-time and law enforcement can be notified immediately for action. Second, if law enforcement authorizes, a false account can be established for the phone using the cloned information complete with updated authorization numbers that serve, for example, as "flags" any time the phone is used. Further, since the phone unit is remotely programmable a homing signal could be enabled in the phone to assist law enforcement in locating the unit. Alternatively, the phone could be equipped with GPS units and information such as the exact location of the unauthorized unit could be supplied to law enforcement each time the phone is used.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
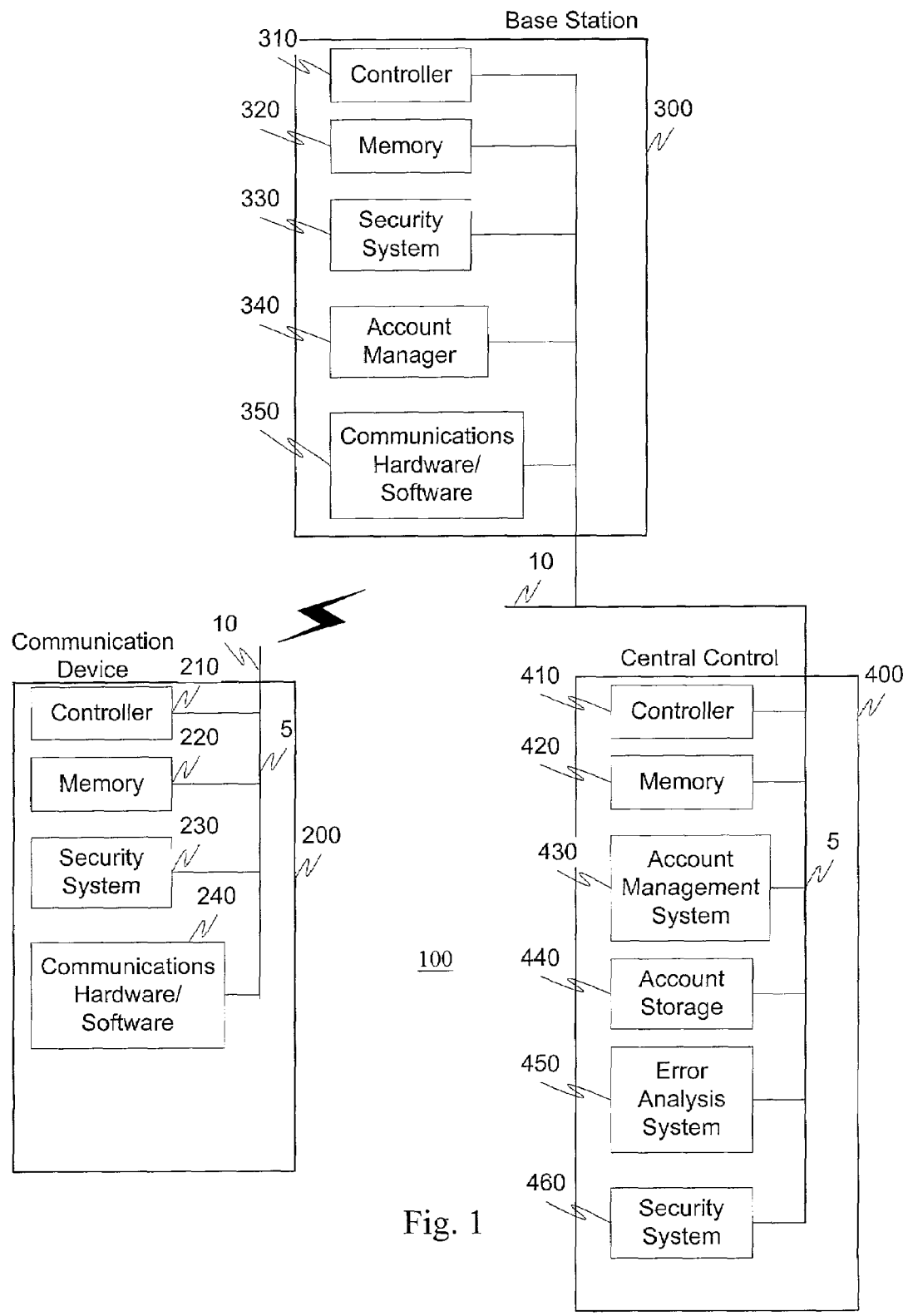
FIG. 1 is a functional block diagram illustrating an exemplary communication system according to this invention.

In an exemplary embodiment of this invention, an authorized access to or cloning of wireless communications equipment is complicated by generating random identification numbers and assigning them to the wireless communication equipment on a dynamic basis with updates to the identification numbers occurring, for example, on each call, on a predetermined time interval or based on a trigger function. For example, the identifiers can be generated in a base station using control software that is capable of maintaining the relationship of a user's phone number, or another comparable identifier, and a corresponding account. This type of technology can be transparent to the mobile customers and the phone company's accounting system. Calls can then be made to and from the mobile communication unit using the originally assigned telephone number and the control software establishes the correlation between the phone number and the random identification number, and places the call using the currently assigned identification number. Thus, when the mobile communications unit places a call, the current identification number is used to identify the mobile unit. The control software in the base station will associate the current identification number from the mobile unit to the current identification number associated with the user's account and complete the call if, for example, the call is authorized. This process can continue with each call or again at a predetermined time interval or based on the occurrence of an event. This provides the communication device with a different identifier, for example, when each call is setup, at the expiration of a time interval or based on a trigger event.

The communication device is initialized when a first communication is made using the originally assigned identifier such as the phone's assigned phone number, identification number and/or pin number. The user may also be required to respond to screening data supplied at the time of purchase to further enhance security during the initialization step. During this initialization, a current and a next identification number are generated, for example, in the base station, and transmitted for storage in the mobile communication unit's memory. Encryption can be used to encode the identifiers prior to transmission using a key unique to each mobile communications unit. The key can be, for example, singular or consist of several parts. In general, any type of encryption techniques can be used with equal success with the systems and methods of this invention. Specifically, the encryption and decryption techniques described herein are for illustrative purposes only and can be altered or modified depending on, for example, the specific embodiment, the telecommunications standard, the available encryption standard(s), or the like. For instance, one portion of a key could be assigned to the phone number during production, another part of the key could be assigned as the initialization of the unit, and yet another key could be updated from time-to-time by, for example, a communications company, such as a telephone company. A copy of the key could then be stored, for example, in the mobile communication device and the user's account maintained by, for example, a base station or a central control.

FIG. 1 illustrates an exemplary communication system 100. The communication system 100 comprises one or more mobile communication devices 200, one or more base stations 300, and one or more central controls 400. For ease of illustration, the exemplary communication system 100 is illustrated having one mobile communication device 200, a single base station 300 and a central control 400. However, it is to be appreciated that a plurality of each of the different devices can be used as necessitated by implementation requirements. The mobile communication device 200 comprises a controller 210, a memory 220, a security system 230 and communications hardware and/or software 240, all interconnected by link 5. The mobile communication device 200 communicates with one or more of a base station 300 and a central control 400 via an antenna 10. The base station 300 comprises a controller 310, a memory 320, a security system 330, an account manager 340 and communications hardware and/or software 350, all interconnected by link 5. The central control 400 comprises a controller 410, a memory 420, an account management system 430, an account storage 440, an error analysis system 450 and a security system 460, all interconnected by link 5.

While the exemplary embodiment illustrated in FIG. 1 shows the various components of the communication system 100 collocated, it is to be appreciated that the various components of the communication system 100 can be located at distant portions of a distributed network, such as a telecommunications network, a local area network, a wide area network, and intranet and/or the internet, or within a dedicated communication system. Thus, it should be appreciated the various components of the communication system 100 can be combined into one or more devices or collocated on a particular node of a distributed network. As will be appreciated from the following description, and for reasons of computational efficiency, the components of the communication system can be arranged at any location within a distributed network without affecting the operation of the system.

Furthermore, the links 5 can be a wired or wireless link or any other known or later developed element(s) that is capable of supplying and communicating electronic data to and from the connected elements. Additionally, the communications hardware and/or software elements 240 and 350 can be any known or later developed elements that are capable of allowing communication between, for example, a wireless device and a base station.

For ease of illustration, the various control signals and data forwarded between the various elements of the communication system will be denoted by their full name, or a symbol representing the information. This information includes a base control signal ($S_B$), and a mobile control signal ($S_M$), both of which are standard telecom control signals. Additionally, a mobile unit identification number (M) and a phone assigned to the mobile unit (P) are standard exchange values. Additional nomenclature is a base station key ($K_B$), a mobile unit key ($K_M$), a current random identification number (C), a next random identification number (N) an encryption function (E), a decryption function (D), an encrypted mobile unit identification number ($M_E$), an encrypted current random identification number ($C_E$) and an encrypted next random identification number ($N_E$).

In operation, the communication device is powered on. During this initialization, the communication device establishes communications with a base station 300. The base station 300 determines whether the communication device 200 requires initialization. If the communication device 200 requires initialization, for example, during a first use, the base station determines and transmits to the communication device a base control signal ($S_B$) an encrypted versions of a mobile unit identification number (M), the communication device's phone number (P), a next random identification number (M), a current random identification number (C), a base station key ($K_B$), and a mobile unit key ($K_M$). These values are decrypted by the communication device 200 and stored in the memory 220.

If the wireless communication has already been initialized, the controller 210, in cooperation with the memory 220, the security system 230, and the communications hardware and/or software 240, retrieves the mobile unit identification number (M) and the base station key and encrypts them to yield an encrypted mobile unit identification number ($M_E$). The encrypted mobile unit identification number is then forwarded to the base station 300 as part of the mobile control signal ($S_M$). The communication device 200 can now be placed in a standby mode waiting for an incoming call or ready to place an outgoing call. Thus, the communication device does not require re-initialization at the next power on. Upon receipt of a send command, for example from the communications hardware and/or software 240, the communication device 200 retrieves the current random identification number (C) and the mobile unit key ($K_M$) and encrypts them to yield an encrypted current random identification number ($C_E$). The security system 230, in cooperation with the controller 210 and the memory 220, then associates the encrypted current random identification number and the mobile control signal ($S_M$). If a call is an outgoing call, the communication device 200, in cooperation with the controller 210, the memory 220, the communications hardware and/or software 240, via link 5 and antenna 10, forwards the mobile control signal and the dialed phone number to the base station 300. For an incoming call, the mobile control signal is forwarded with the encrypted current random identification number to the base station 300. If the call is approved by the base station 300, the call is allowed and commences until receipt of, for example, an "end command" via the communications hardware and/or software 240. If, however, the call is not approved by the base station 300, an error analysis can be performed via the error analysis system 450 described later.

Upon receipt of the "end command" via, for example, the push of a button (not shown) on the communication device 200, an end call command is forwarded from the communication device 200 to the base station 300. The base station 300 returns to the communication device 200 the base control signal ($S_B$). From the base control signal, the security system 230, in cooperation with the controller 210 and the memory 220, extracts the encrypted next random identification number, and decrypts the next random identification number. Then, in cooperation with the controller 210 and the memory 220, the next random identification number (N), the current random identification number (C) and the base station key are updated and stored. The communication device 200 is again ready for making or receiving another call, or to be turned off. Similarly, when a call is dropped, the user presses the "End" button and then makes another call, for example, by redialing the number of the dropped call.

The base station 300 can be, for example, a cellular phone tower, a satellite, a dedicated base station or base station network, or the like. Similarly, the central control 400 can be a portion of a telecommunications company, and any combination of land line system, wireless system, satellite system, microwave system, or the like. However, the various components of the base station 300 and the central control 400 can also be combined into one or more systems. The base station 300 operates by receiving a request from a communication device 200. Communications are then established as is well known in the art with the communication device. If the communication device requires initialization, the encrypted mobile unit identification number ($M_E$) is received by the base station 300 and decrypted, with the cooperation of the controller 310, the memory 320, and the security system 330, with the base station key ($K_B$).

Alternatively, if the communication device 200 does not require synchronization and/or initialization, the base station 300, in cooperation with the account manager 340, determines if the mobile unit identification number is available. If the account manager 340 determines that the mobile unit identification number is not available, the central control, via links 5, and in cooperation with the account management system 430, the memory 420, the controller 410 and the account storage 440, is requested to update the account for the this particular user. Alternatively, if the mobile unit identification number is present, the account data is retrieved from, for example, one or more of the account manager 340 and the account storage 440.

Upon receipt of a call request, or the notification by the base station 300 that the communication device 200 is receiving an incoming call, the mobile control signal is received from the communication device 200. From the mobile control signal, the current random identification number can be extracted and decrypted based on the mobile unit key. Next, the security system 330, in cooperation with the memory 320 and the controller 310, compares the received current random identification number with the current random identification numbers stored by the account manager 340. If the security system 330 determines the two random identification numbers match, the call is placed and/or received utilizing the standard communications hardware and/or software devices 240 and 350 as is well known. However, if the security system 330 determines that the random identification numbers do not match, the call is not allowed and a flag can be optionally sent to central control 400 to initiate error analysis.

Assuming the random identification numbers match, the base station allows the call and waits for an "end call" signal from the communication device 200. Upon receipt of the end call request, the base station 300 retrieves the next random identification number from the security system 330 and encrypts the next random identification number using the base station key. This information is then forwarded in the base control signal to the communication device 200.

The central control 400 cooperates with the base station 300 to maintain master user accounts. In operation, the central control 400, via link 5 and in cooperation with the controller 410 and the memory 420, receives a request for account data based on the mobile unit identification number. As can be appreciated, all, or a portion of the communications between the base station 300, the central control 400 and the communication device 200 can be encrypted by one or more of a plurality of different encryption techniques. The frequency with which the various communications identifiers are updated is directly proportional to the security of the overall system. This security of the system can be further enhanced through the use of optional encryption techniques throughout, or in a portion of, the exchanged communications.

Upon receiving an account data request, the account management system 430, in cooperation with the account storage 440 and the security systems 460, determines a current random number identification table and a next random number identification table. These tables are then associated with the account master file in cooperation with the account management system 430 the account storage 440 the controller 410 and the memory 420. The central control then encrypts and forwards the phone number assigned to the communication device, the mobile unit key, the next random identification number, the current random identification number and the mobile unit communication number to the base station.

If, for example, the central control 400 determines that the received current random identification number does not correspond to the current random identification number in storage, error analysis can be performed by the central control 400. In particular, for example, all or a portion of the incoming, or outgoing calls can be blocked. Next, for example, in cooperation with the error analysis system 450, the memory 420, and the controller 410 and via link 5 and with the cooperation of the base station 300, a message can be forwarded to the user requesting verification information from that user. For example, the verification could encompass requesting a pin number, a unique identifier, a password, or the like. In general, the verification request can be any information exchange that allows the central control 400 to validate the authenticity of the communication device 200. If the verification information returned from the communication device 200 is correct, the error analysis system 450, in cooperation with the controller 410, and the memory 420 determines a next random identification number and a base station key which are forwarded, with the cooperation of the base station 300, in the base control signal ($S_B$) to the communication device. Thus, the communication device 200 is essentially re-initialized and ready for further communication.

Alternatively, if the verification returned from the communication device 200 is not correct, alternative action can be taken. For example, law enforcement personnel can be contacted, the communication device remotely disabled, tracking of the communication device commenced, for example, through the Global Positioning System (GPS), or the like.

Figure 2:
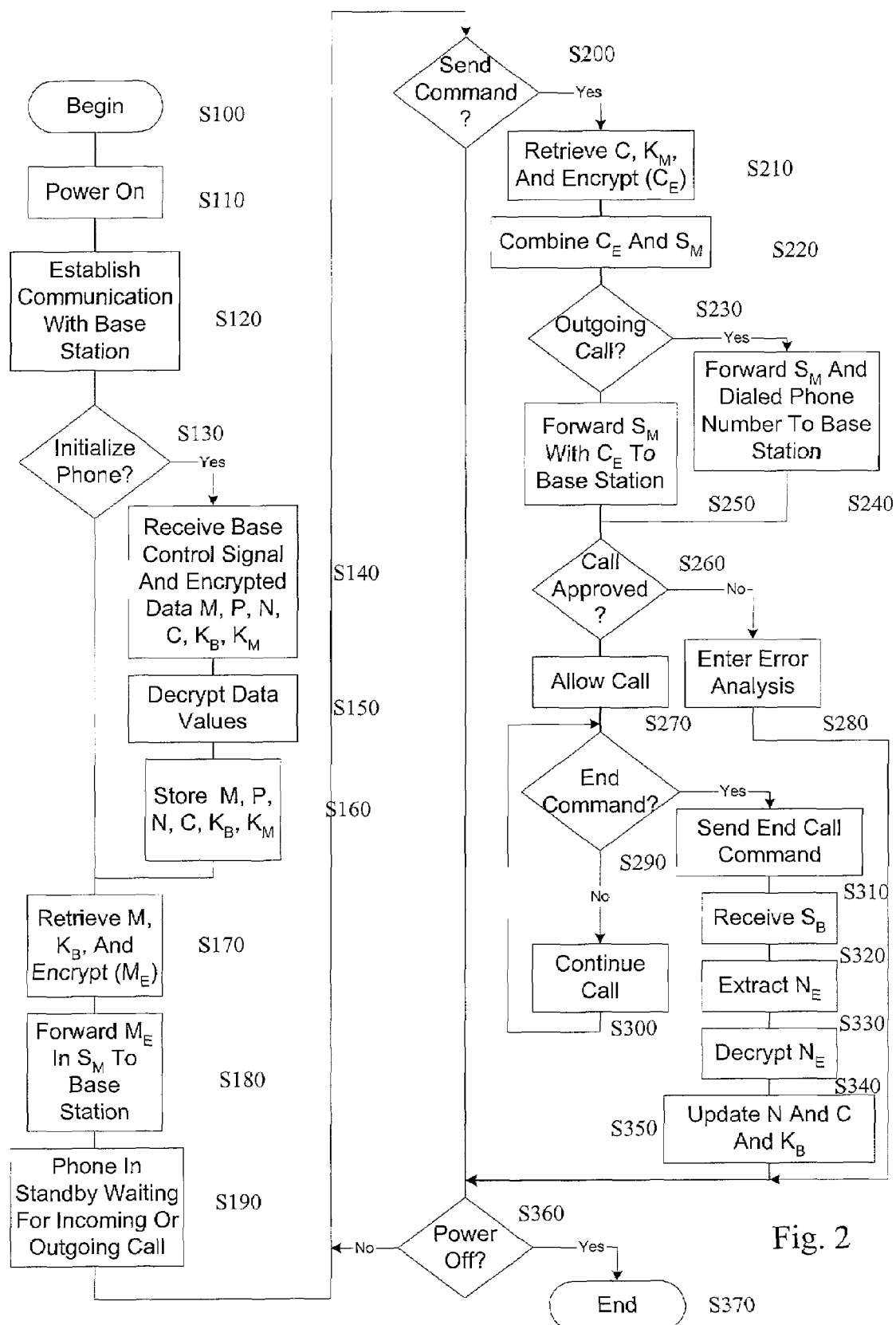
FIG. 2 is a flowchart outlining an exemplary method for mobile unit operation according to this invention.

FIG. 2 illustrates a flowchart outlining an exemplary embodiment of the operation of the communication device. In particular, control begins in step S100 and continues to step S110. In step S110, the communication device is powered on. Next, in step S120, communication is established between the communication device and the base station. Then, in step S130, a determination is made whether the communication device requires initialization. If the communications device requires initialization, control continues to step S140. Otherwise, control jumps to step S170. In step S140, the communications device receives the base control signal, an encrypted mobile unit identification number, the phone number assigned to the communications device, the next random identification number, the current random identification number, the base station key and the mobile unit key. Next, in step S150, these data values are decrypted. Then, in step S160, the received values are stored. Control then continues to step S170.

In step S170, the mobile unit identification number and the base station key are retrieved and the mobile unit identification number is encrypted. Next, in step S180, the encrypted mobile unit identification number is associated with the mobile control signal and forwarded to the base station. Then, in step S190, the communication device enters a standby mode waiting for an incoming or an outgoing call. Control then continues to step S200.

In step S200, a determination is made whether a "send" command has been received. If a send command is received, control continues to step S210. Otherwise, control jumps to step S360.

In step S210, the current random identification number and the mobile unit key are retrieved and encrypted to yield an encrypted current random identification number. Next, in step S220, the encrypted current random identification number and the mobile control signal are associated. Next, in step S230, a determination is made whether the send command is to place an outgoing call, or receive an incoming call. For an outgoing call, control continues to step S240. In step S240, the mobile control signal ($S_M$) and dialed phone number are forwarded to the base station. Control then continues to step S260.

Alternatively, if the send command is received in response to an incoming call, the mobile control signal with the encrypted current random identification number are forwarded to the base station. Control then continues to step S260.

In step S260, a determination is made whether the call has been approved. If the call has been approved, control continues to step 270 where the call is allowed. Next, in step 290, a determination is made whether an "end" command to end the call has been received. If an end command has not been received, control continues to step S300 where the call continues. Then, control continues back to step S290.

Alternatively, if the end command has been received, control continues to step S310. In step S310, the end call command is sent to the base station. Next, in step S320, the base control signal is received by the communication device. Then, in step S330, the encrypted next random identification number is extracted from the base control signal. Control then continues to step S340.

In step S340, the encrypted next random identification number is decrypted. Next, in step S350, the next random identification number, the current random identification number and the base station key are updated. Control then continues to step S360.

Alternatively, and optionally, if the call is not approved in step S260, control jumps to step S280 for error analysis. Control then continues to step S360.

In step S360, a determination is made whether a "power off" command has been received. If a power off command has been received, control continues to step S370 where the control sequence ends. Alternatively, control jumps back to step S200.

Figure 3:
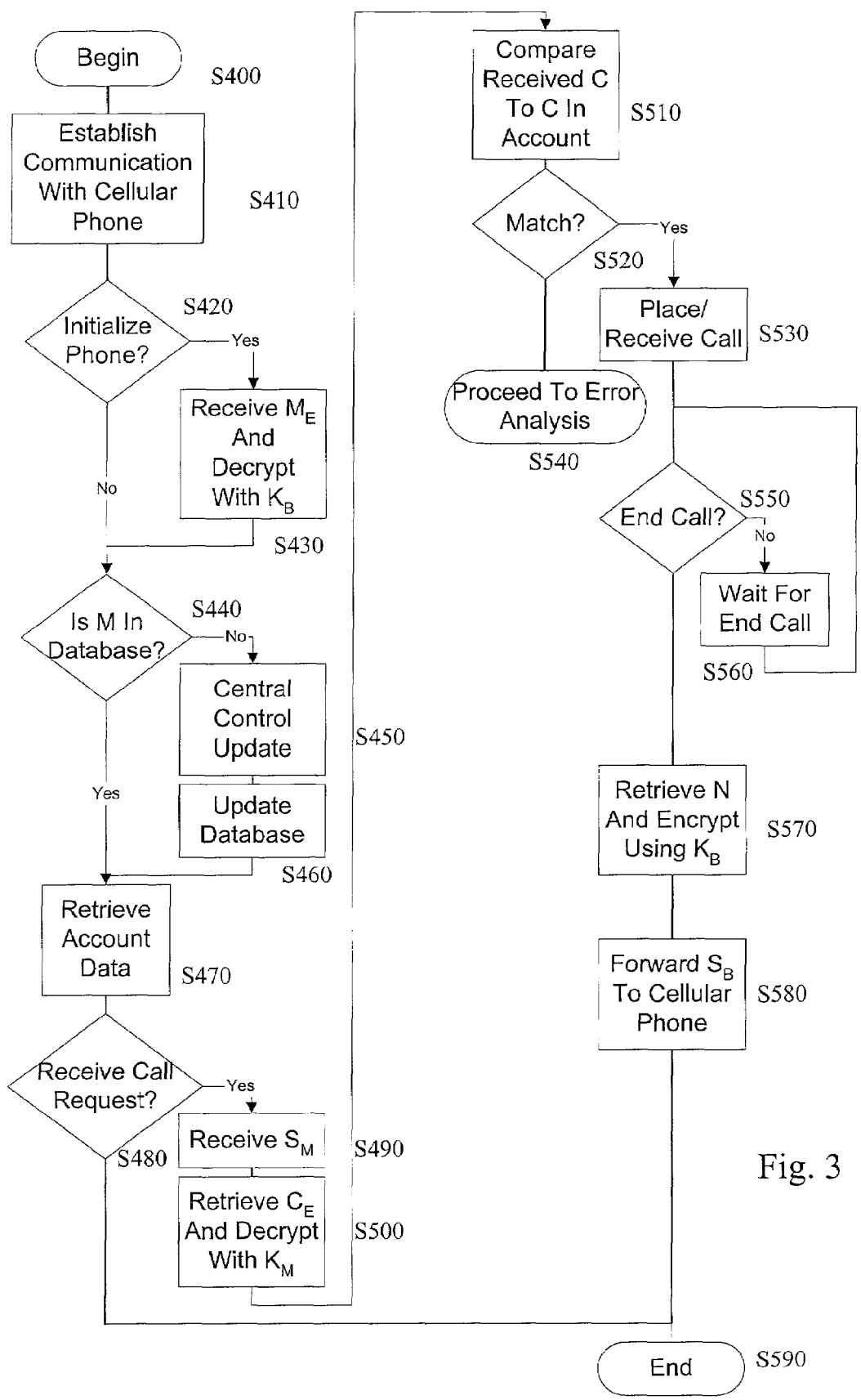
FIG. 3 is a flow chart outlining an exemplary method of the operation of base stations according to this invention.

FIG. 3 illustrates a flow chart outlining an exemplary embodiment of the operation of a base station. In particular, control begins in step S400 and continues to step S410. In step S410, communication is established with the communication device. Next, in step S420, a determination is made whether the communication device requires initialization. If the communication device requires initialization, control continues to step S430. Otherwise, control jumps to step S440.

In step S430, the encrypted mobile unit identification number is received from the communication device and decrypted using the base station key. Control continues to step S440.

In step S440, a determination is made whether the mobile unit identification number is available to the base station. If the mobile unit identification number is not available from the base station, control continues to step S450. Otherwise, control jumps to step S470. In step S470, the account data corresponding to the mobile unit identification number is retrieved. Control continues to step S480.

In step S450, the central control is accessed for an update. Then, in step S460, the base unit identification number database is updated. Control then continues to step S470.

In step S480, a determination is made whether a call request has been made. If a call request, either incoming or outgoing, has been made, control continues to step S490. Otherwise, control jumps to step S590 where the control sequence ends.

In step S490, the mobile control signals is received. Next, in step S500, an encrypted current random identification number is received and decrypted using the mobile unit key. Then, in step S510, the decrypted current random identification number is compared to the current random identification number stored, for example using the identification number tables, that corresponds to the mobile unit identification number. Control then continues to step S520.

In step S520, a determination is made whether the two random current random identification numbers match. If the two current random number identification numbers match, control continues to step S530. Otherwise, control jumps to step S540 where error analysis is performed.

In step S530, the call is received or placed as appropriate. Next, in step S550, a determination is made whether an end call command has been received. If an end call command has not been received, control continues to step S560 where the system waits for the end call command. Control then continues back to step S550.

Otherwise, control jumps to step S570 where the next random identification number is retrieved and encrypted using the base station key. Next, in step S580, the base control signal, which includes the encrypted next random identification number, is forwarded to the communication device. Control then continues to step S590 where the control sequence ends.

Figure 4:
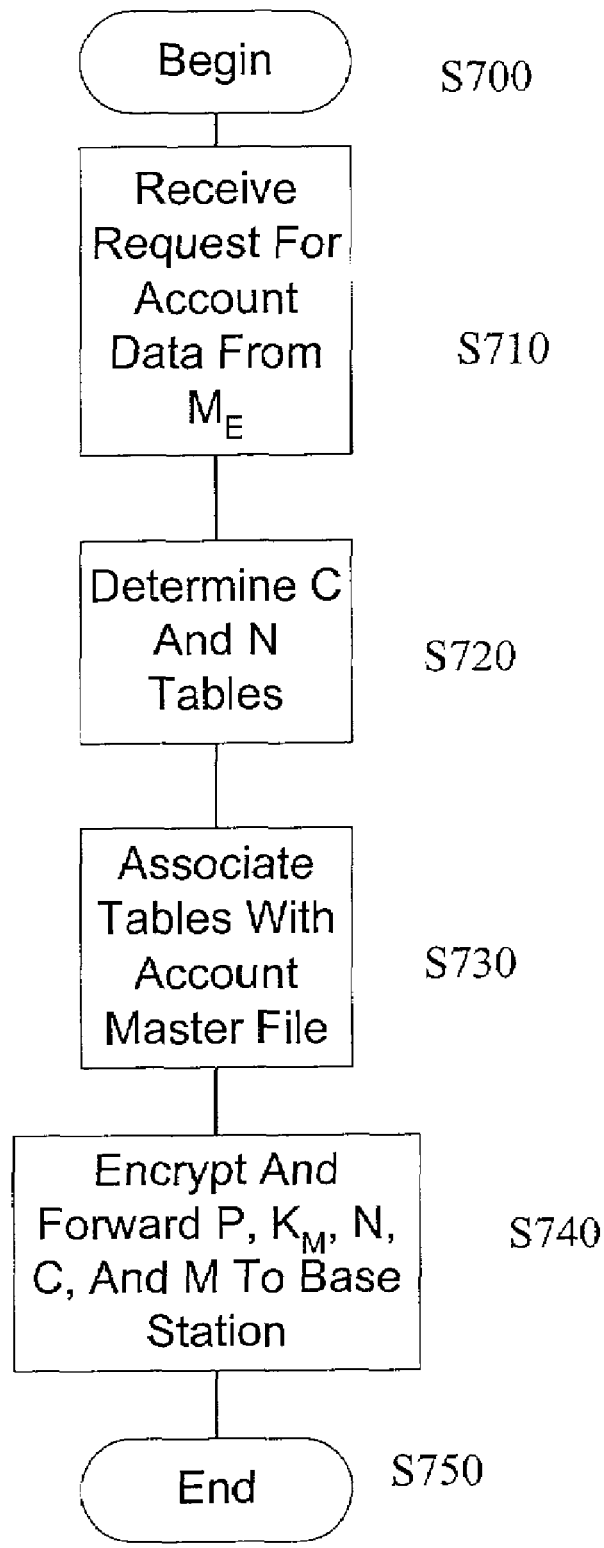
FIG. 4 is a flowchart outlining an exemplary method for operating a central control according to this invention.

FIG. 4 shows a flow chart outlining an exemplary embodiment of the operation of the central control. In particular, control begins at step S700 and continues to step S710. In step S710, a request for account data based on encrypted mobile unit identification number is received. Next, in step S720, the current random identification number and next random identification number tables are determined. Then, in step S730, the determined tables are associated with the account master's file based on the mobile unit identification number. Control then continues to step S740.

In step S740, the phone number assigned to the mobile unit, the mobile unit key, the next random identification number, the current random identification number and the mobile unit identification number to the base station. Control then continues to step S750 where the control sequence ends.

Figure 5:
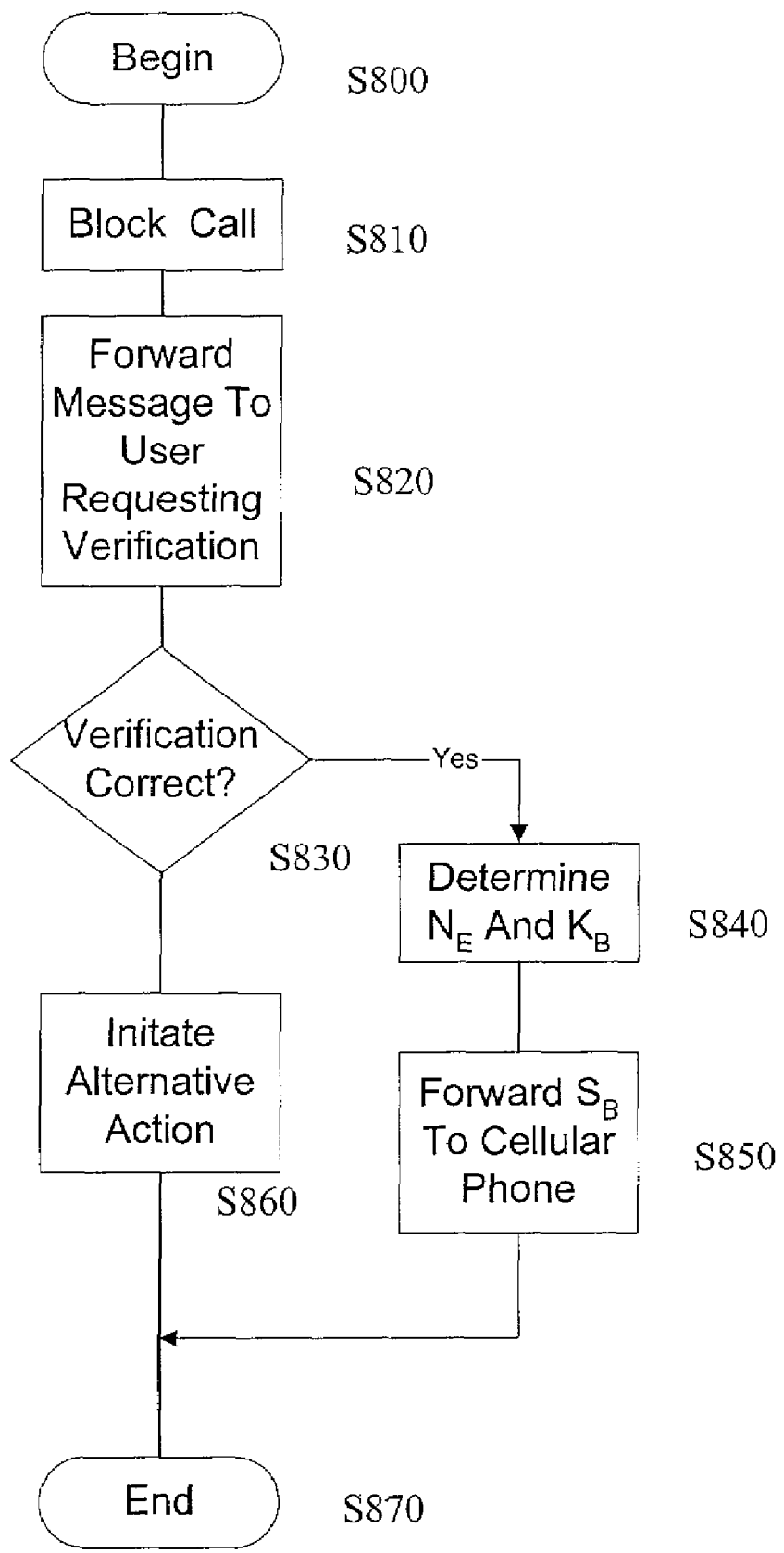
FIG. 5 is a flow chart outlining an exemplary method for error analysis according to this invention.

FIG. 5 illustrates a flow chart outlining an exemplary embodiment of the error analysis step S540 in FIG. 3. In particular, control begins in step S800 and continues to step S810. In step S810, the communication is blocked. Next, in step S820, a message is forwarded to the communication device requesting verification. Then, in step S830, a determination is made whether the received verification is correct. If the received verification is correct, control continues to step S840. Otherwise, control jumps to step S860 where alternative action is initiated. Control then continues to step S870 where the control sequence ends.

In step S840, the next random identification is retrieved and encrypted using the base station key. Then, in step S850, the base control signal including the encrypted next random identification is forwarded to the communication device. Control then continues to step S870 where the control sequence ends.

As illustrated in FIG. 1, the communications system and related components can be implemented on one or more communications devices, or a one or more separate programmed general purpose computer having a communications hardware and/or software. However, the communications system can also be implemented in a special purpose computer, a programmed microprocessor or microcontroller and peripheral integrated circuit element, an ASIC or other integrated circuit, a digital signal processor, a hardwired or electronic or logic circuit such as a discrete element circuit, a programmable logic device such as a PLD, PLA, FPGA, PAL, or the like, and associated communications equipment. In general, any device capable of implementing a finite state machine that is in turn capable of implementing the flowcharts illustrated in FIGS. 2–5 can be used to implement the communications system 100 according to this invention.

Furthermore, a disclosed method may be readily implemented in software using object or object-oriented software development environment that provides portable source code that can be used on a variety of computers, workstations, or communications platforms. Alternatively, the disclosed communications system may be implemented partially or fully in hardware using standard logic circuits or a VLSI design. Other software or hardware can be used to implement the systems in accordance with this invention depending on the speed and/or efficiency requirements of the systems, the particular function, and the particular software or hardware systems or microprocessor or microcomputer systems being utilized. The communications system illustrated herein, however, can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods can be readily implemented as software executed on a programmed general purpose computer, a special purpose computer, a microprocessor and associated communications equipment, or the like. In these instances, the methods and systems of this invention can be implemented as a program embedded in ore or more communications devices, such as a cellular phone, satellite phone, or the like. The communications system can also be implemented by physically incorporating the system and method in a software and/or hardware system, such as a hardware and software system of a cell phone and associated base station systems, or the like.

It is, therefore, apparent that there has been provided in accordance with the present invention, systems and methods for increasing communications security. While this invention has been described in conjunction with a number of exemplary embodiments, it is evident that many alternatives, modifications and variations would be or are apparent to those of ordinary skill in the applicable art. Accordingly, the Applicants intend to embrace all such alternatives, modifications, equivalents and variations that are within the spirit and the scope of this invention.

What is claimed is:

1. A system for preventing unauthorized communication, the system comprising:
   a mobile unit having a static mobile unit identifier that uniquely identifies the mobile unit, the mobile unit generating a first random identification number, the mobile unit storing the first random identification number;
   a base station in communication with the mobile unit; and
   a central control in communication with the base station, the central control
   generating a second generated identification number from a use of a table associated with the static mobile unit identification number and communicating the second generated random identification number to the base station,
   wherein the base station receives the first random identification number from the mobile unit and compares the first random identification number to the second generated random identification number, thereby providing security, and
   wherein the first random identification number is updateable, and is updated with each call based on the static mobile unit identifier, at a periodic time interval, and/or upon an occurrence of a triggering event.

2. The system of claim 1, further comprising at least one account management system that maintains the association between the static mobile unit identifier and the first random identification number.

3. The system of claim 1, further comprising a security system that detects unauthorized communications based on the static mobile unit identifier.

4. The system of claim 1, further comprising at least one account management system that updates the first random identification number.

5. The system of claim 1, further comprising at least one security system that is capable of at least one of encrypting and decrypting a portion of the communications based on the static mobile unit identifier between the mobile unit and another device.

6. The system of claim 1, wherein the mobile unit is at least one of a mobile phone, a pager, a mobile communications device and a wireless modem.

7. The system of claim 1, wherein the base station is at least one of a cellular tower, a satellite and a relay station for providing communications based on the static mobile unit identifier and the first random identification number.

8. The system of claim 1, wherein the central control is at least one of a portion of a communications system, a telecommunications system and a satellite communications system for providing communications based on the static mobile unit identifier and the first random identification number.

9. The system of claim 1, wherein a current one of the first random identification number replaces the static mobile unit identifier during communications with the mobile unit.

10. The system of claim 1, wherein the static mobile unit identifier is based on a telephone number of the mobile unit.

11. The system of claim 1, wherein the static mobile unit identifier is a telephone number of the mobile unit.

12. The system of claim 1, wherein the first random identification number and the second generated random identification number used for updating the first random identification number are exchanged in a secure manner.

13. The system of claim 12, wherein the secure manner for exchanging the first random identification number and the second generated random identification number is based on cryptography.

* * * * *